(12) United States Patent
Huotari et al.

(10) Patent No.: US 8,186,740 B2
(45) Date of Patent: May 29, 2012

(54) CABLE TONNEAU SYSTEM

(75) Inventors: Keijo J. Huotari, Fenton, MI (US); Eric Hanson, Dearborn, MI (US); Stephen J. Lewis, Harrison Township, MI (US); Duane C. Junkin, Madison Heights, MI (US)

(73) Assignee: Magna International, Inc., Aurora, Ontario ( * ) Notice: Subject to any disclaimer, the term of this patent is extended or adjusted under 35 U.S.C. 154(b) by 385 days.

(21) Appl. No.: 12/456,729

(22) Filed: Jun. 22, 2009

(65) Prior Publication Data

US 2010/0320798 A1    Dec. 23, 2010

(51) Int. Cl.
*B60P 7/02* (2006.01)
(52) U.S. Cl. ............... 296/100.17; 296/114; 296/113; 296/100.09
(58) Field of Classification Search .......... 296/100.14–100.18, 100.09, 111, 296/113, 136.01–136.03, 105, 107.09, 114; *B60P 7/02*
See application file for complete search history.

(56) References Cited

U.S. PATENT DOCUMENTS

| 3,773,379 | A | * | 11/1973 | Loiseau | 296/107.09 |
| 4,162,100 | A | * | 7/1979 | Muscillo | 296/100.12 |
| 6,715,817 | B2 | * | 4/2004 | Nolan et al. | 296/100.12 |
| 7,481,478 | B2 | * | 1/2009 | Cho et al. | 296/37.16 |
| 2010/0109373 | A1 | * | 5/2010 | Pivetta | 296/100.11 |

* cited by examiner

*Primary Examiner* — Glenn Dayoan
*Assistant Examiner* — Pinel Romain
(74) *Attorney, Agent, or Firm* — Warn Partners, P.C.

(57) ABSTRACT

The present invention is a cable tonneau system having at least one frame assembly selectively mounted to a vehicle, and at least one bow portion having a plurality of links pivotally connected to the frame assembly. Also included is a cover operatively connected to the frame assembly and the bow portion for concealing a storage area of the vehicle. The frame assembly and the plurality of links are operable to be pivoted between a stowed position and a deployed position. The cover is positioned to expose the storage area of the vehicle when the frame assembly and the plurality of links are in the stowed position. The cover conceals the storage area of the vehicle when the frame assembly and the plurality of links are in the deployed position.

32 Claims, 15 Drawing Sheets

CABLE TONNEAU SYSTEM

FIELD OF THE INVENTION

The present invention relates to an easy to use tonneau cover for a vehicle having a bed, such as a pickup truck.

BACKGROUND OF THE INVENTION

It is commonplace for various owners of vehicles such as pickup trucks to incorporate the use of a tonneau cover for providing items stored in the bed with protection from the elements. Tonneau covers are also used to provide an aesthetically pleasing appearance to a pickup truck.

There are various types of tonneau covers that are used with a pickup truck. One type of cover is a single-piece cover made of fiberglass or another type of rigid material (often called a "hard" tonneau cover). These types of covers typically open through the use of hinges attached to the front of the bed behind the cab of the truck, and are supported by air struts when in an open position. One of drawback to this type of tonneau cover is that the cover typically has a limited range of motion when moving from an open position to a closed position, and vice versa, limiting the amount of items that can be stored in the bed of the truck. Also, hard tonneau covers typically have a latch which connects the cover to the tail gate for the purpose of providing additional attachment of the cover to the bed of the truck, which is necessary when the vehicle is moving because damage to the cover may occur if the cover is left open when the vehicle is moving. Because the cover typically must be secured to the tail gate during vehicle travel to prevent damage to the cover, the types of items that may be stored in the bed are limited in size to being less than the height of the bed.

Another type of tonneau cover used with pickup trucks is what is commonly referred to as a "soft" tonneau cover. A soft tonneau cover is typically made of a fabric, such as vinyl, which attaches to a frame having side rails, with the frame being attached to the side walls of the bed. The fabric is typically attached to the frame through the use of snap features, or the like. There are also a series of cross bows attached to the side rails of the frame which support the fabric in the middle area of the bed. This type of soft tonneau cover is quite cumbersome to use because it requires the detachment of the fabric and the bows from the side rails of the frame to place items in the bed of the pickup. Also, if the item being transported in the bed of the pickup is quite large, it may not be possible to reassemble the bows and the fabric to the frame, creating the problem of stowing the fabric and the bows when they are not in use.

Attempts have been made to create a tonneau cover which is readily changeable between a stowed and a deployed position. One particular solution has been to provide a foldable frame. However, this particular design requires the fabric remain connected to the side rails of the frame, and the fabric is subjected to having discrete fold points, causing excessive wear in the fabric around the areas of the hinges.

Accordingly, there exists a need for an improved tonneau cover which overcomes the aforementioned drawbacks.

SUMMARY OF THE INVENTION

The present invention is a cable tonneau system having at least one frame assembly selectively mounted to a vehicle, and at least one bow portion having a plurality of links pivotally connected to the frame assembly. Also included is a cover operatively connected to the frame assembly and the bow portion for concealing a storage area of the vehicle.

The frame assembly and the plurality of links are operable to be pivoted between a stowed position and a deployed position. The cover is positioned to expose the storage area of the vehicle when the frame assembly and the plurality of links are in the stowed position. The cover conceals the storage area of the vehicle when the frame assembly and the plurality of links are in the deployed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
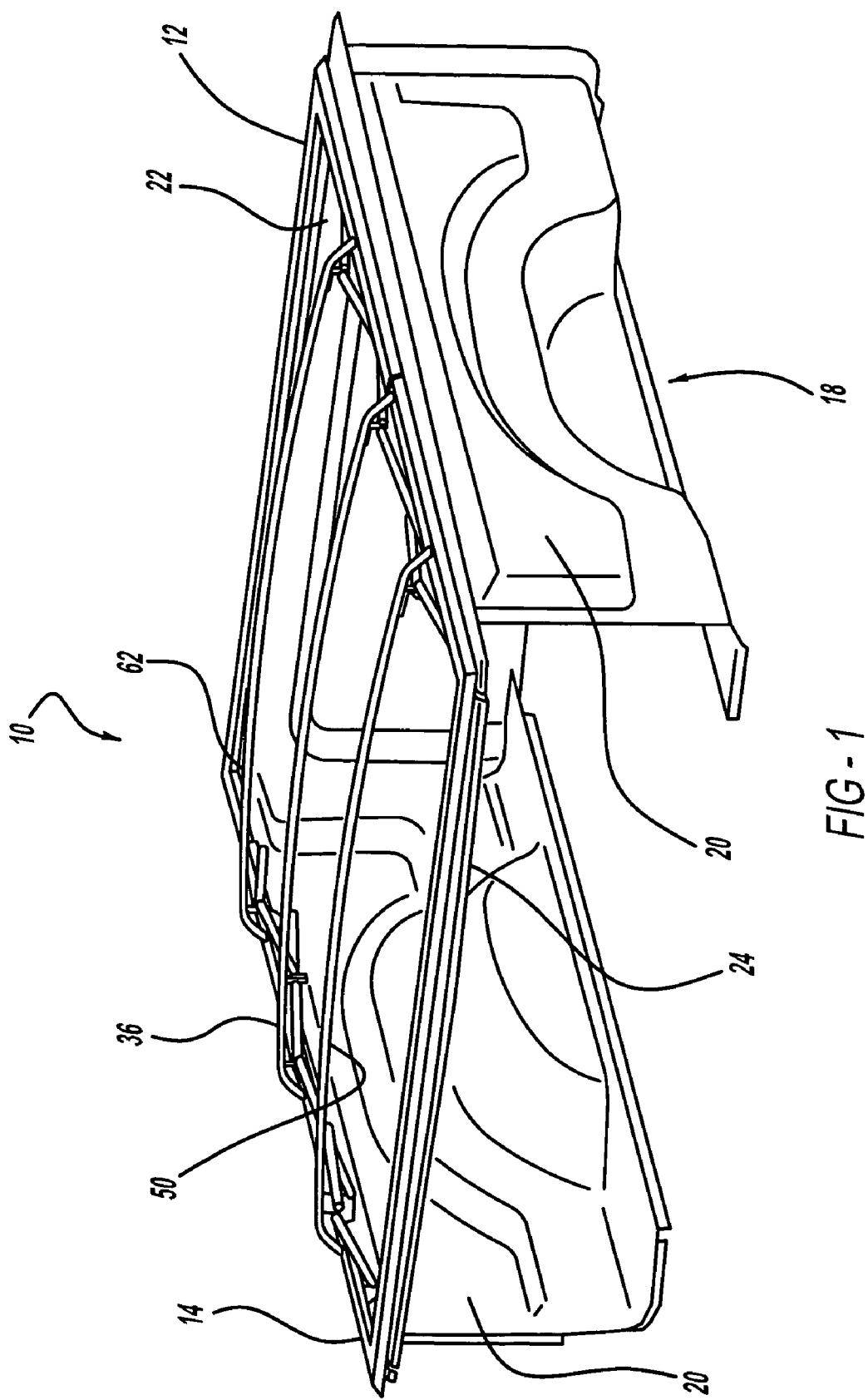
FIG. 1 is a perspective view of a cable tonneau system in a deployed position attached to the bed of a pickup truck with the cover removed, according to the present invention.
Figure 2:
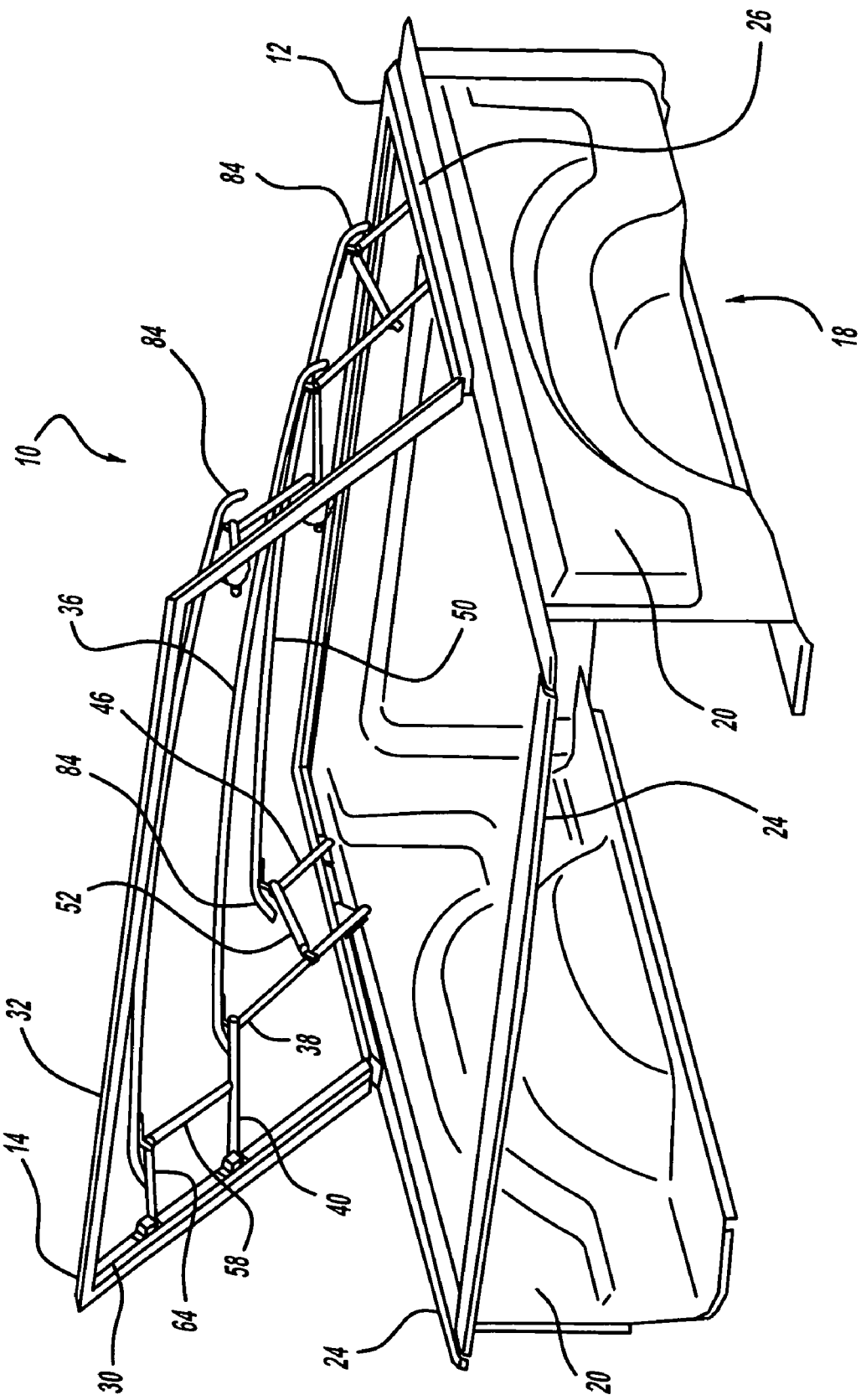
FIG. 2 is a perspective view of a cable tonneau system in a first partially open position attached to the bed of a pickup truck with the cover removed, according to the present invention.
Figure 3:
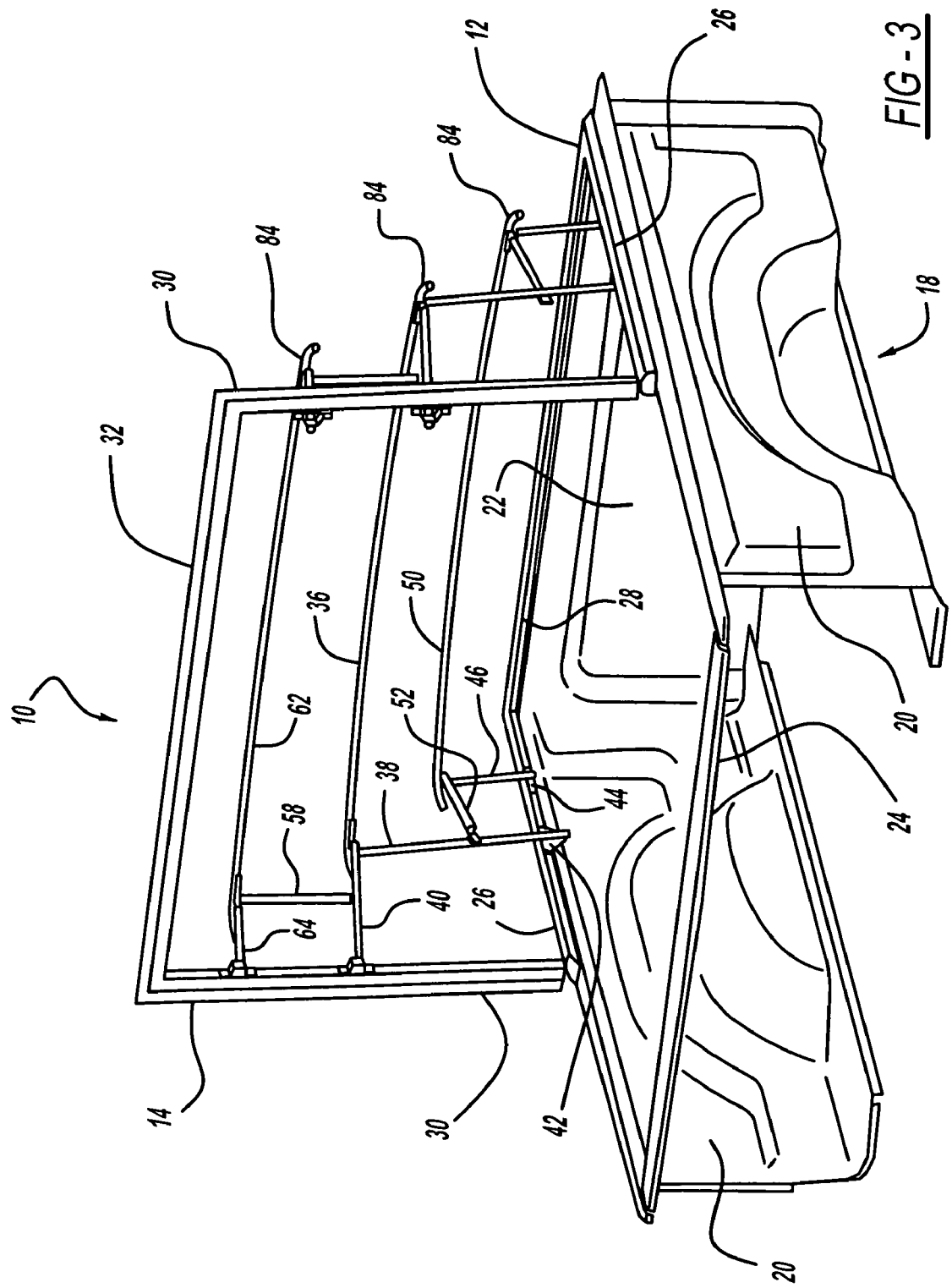
FIG. 3 is a perspective view of a cable tonneau system in a second partially open position attached to the bed of a pickup truck with the cover removed, according to the present invention.
Figure 4:
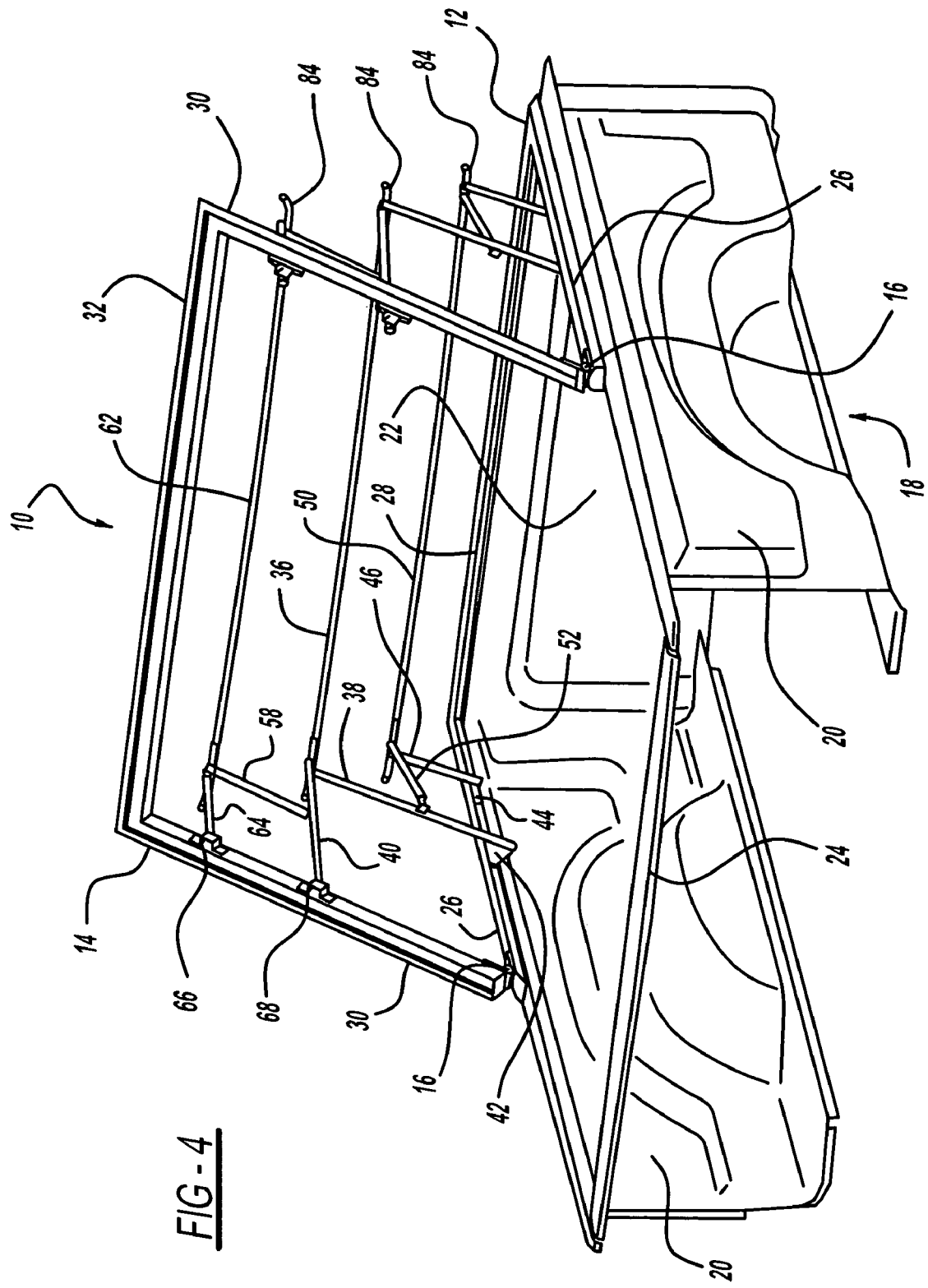
FIG. 4 is a perspective view of a cable tonneau system in a third partially open position attached to the bed of a pickup truck with the cover removed, according to the present invention.
Figure 5:
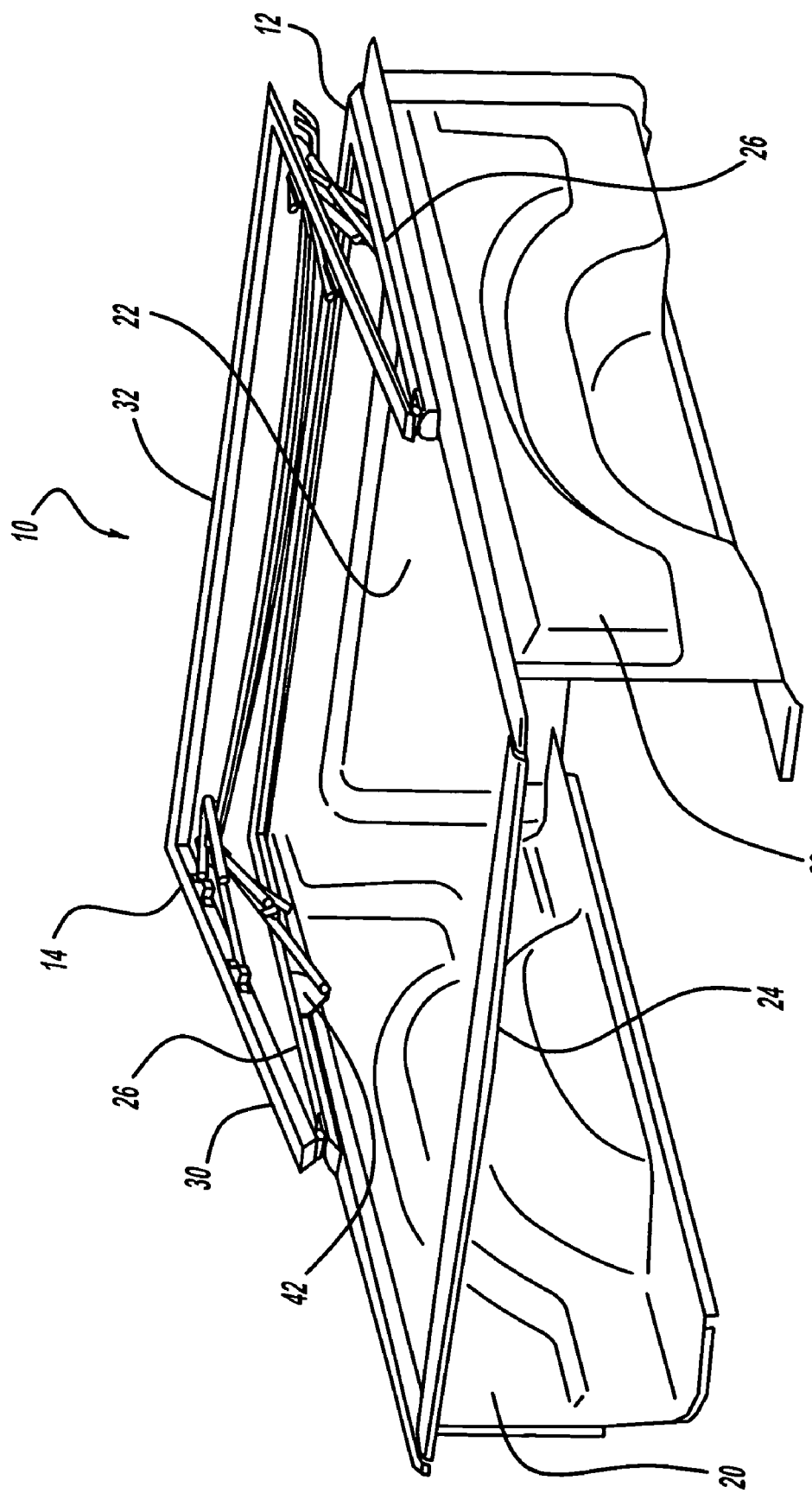
FIG. 5 is a perspective view of a cable tonneau system in a fully stowed position attached to the bed of a pickup truck with the cover removed, according to the present invention.

The following description of the preferred embodiment(s) is merely exemplary in nature and is in no way intended to limit the invention, its application, or uses.

A cable tonneau system according to the present invention is shown in the Figures generally at 10. The system 10 includes a front frame assembly 12 pivotally attached to a rear frame assembly 14 through the use of a first hinge 16. The frame assemblies 12,14 are attached to a vehicle to work in conjunction with a storage area of a vehicle, such as a pickup bed, generally shown at 18. The bed 18 includes sidewalls 20 and a front wall 22. The system 10 also includes a base frame 24 attached to the bed 18, upon which the frame assemblies 12,14 are mounted. The front frame assembly 12 has a pair of front side rails 26 connected to a front cross rail 28, and the rear frame assembly 14 includes a pair of rear side rails 30 and a rear cross rail 32. The rear frame assembly 14 is selectively connected to the base frame 24, the function of which will be described later.

Figure 6:
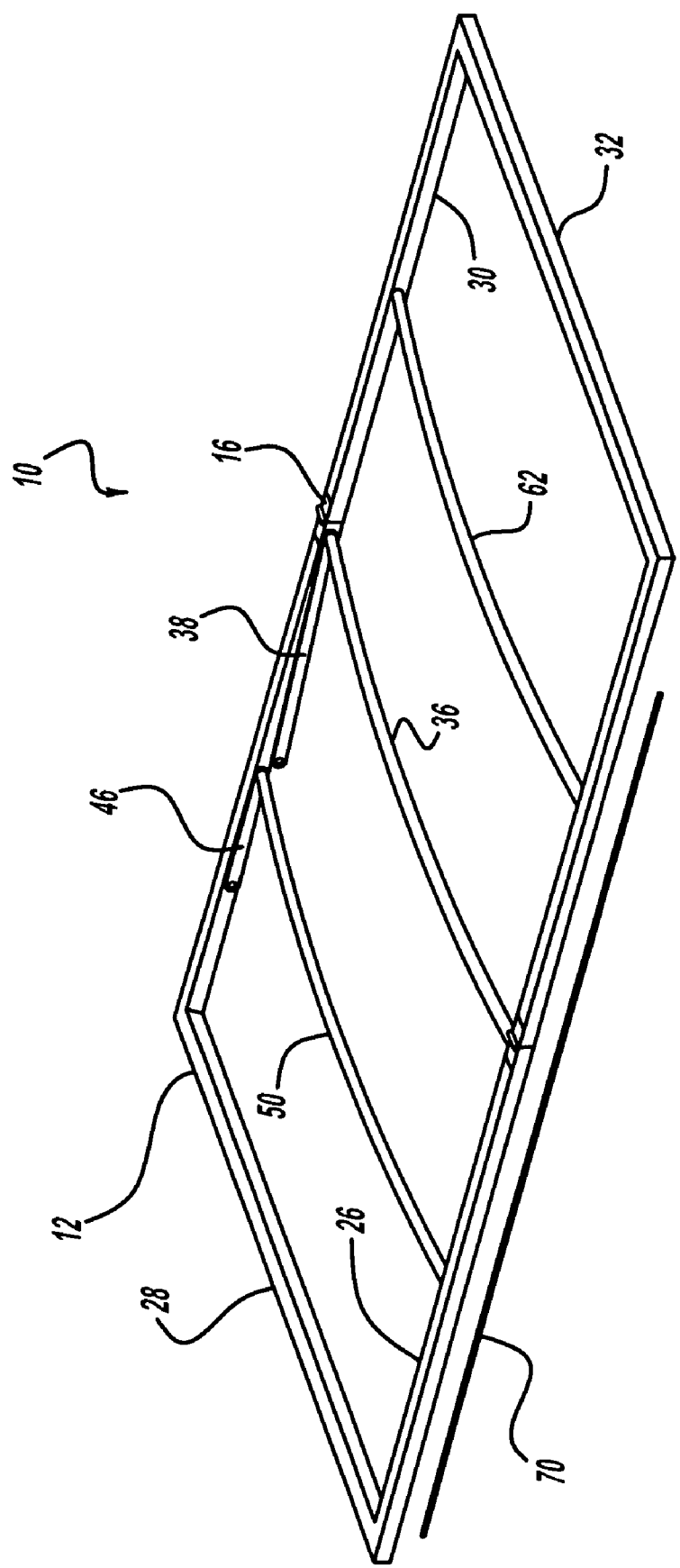
FIG. 6 is a perspective view of a cable tonneau system in deployed position with the cover removed, according to the present invention.
Figure 7:
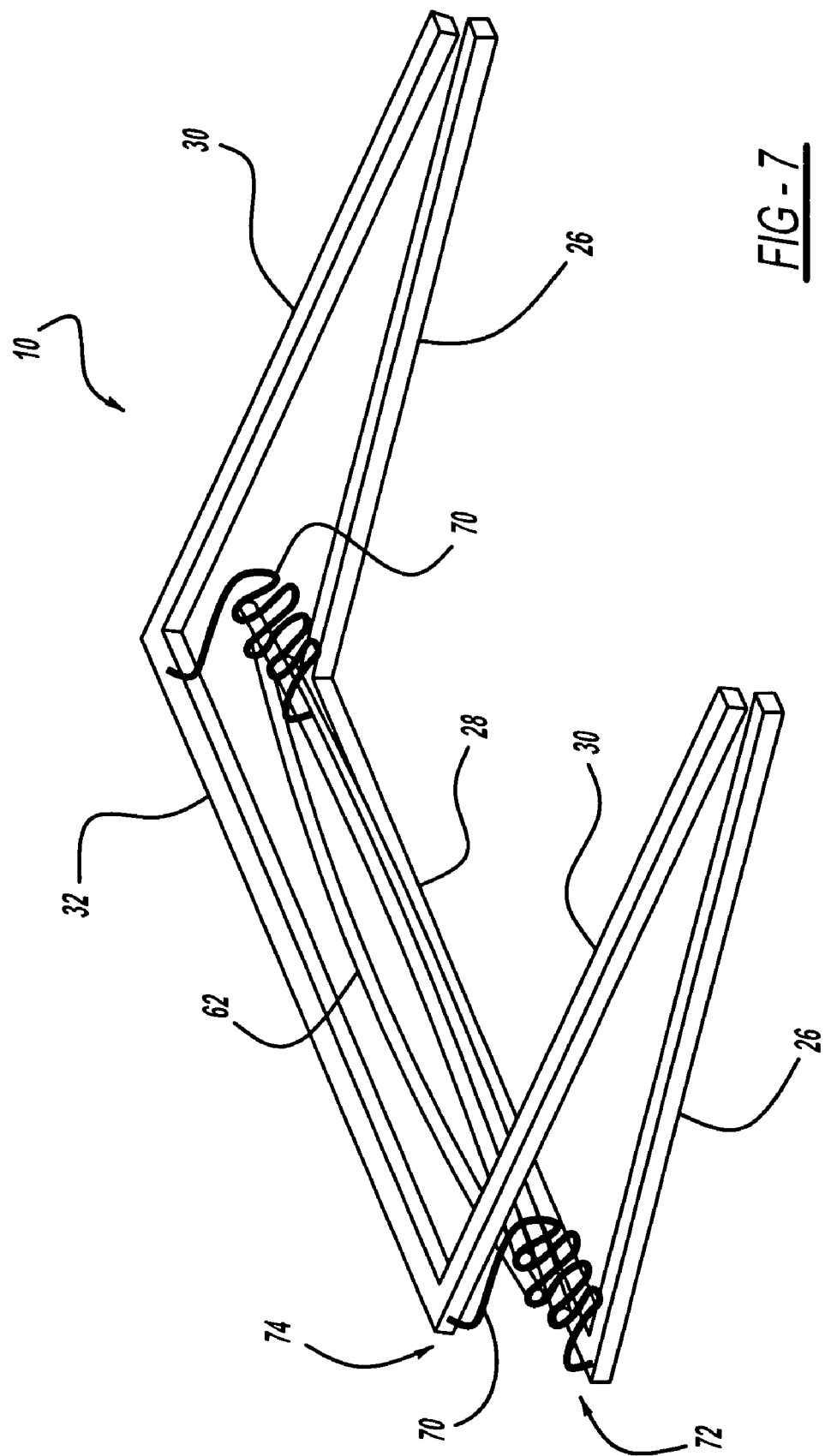
FIG. 7 is a perspective view of a cable tonneau system in a fully stowed position with the cover removed, according to the present invention.
Figure 14:
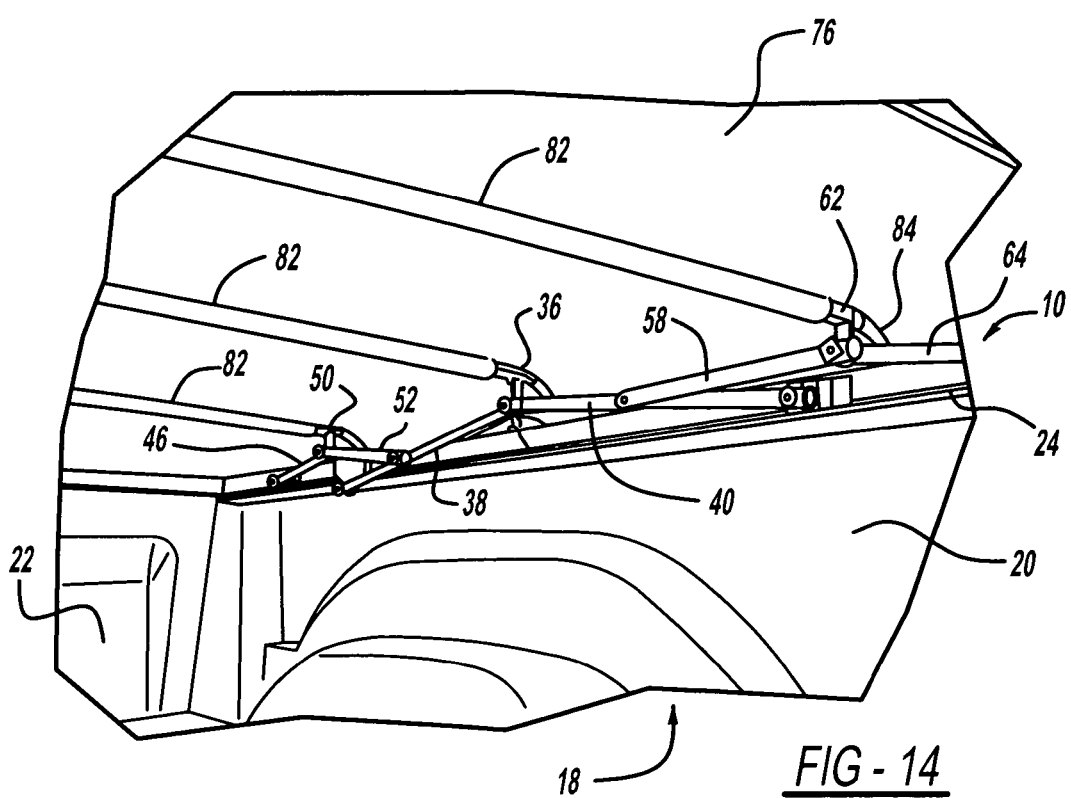
FIG. 14 is a second perspective view of a cable tonneau system attached to the bed of a pickup truck, according to the present invention.

Pivotally attached to both the front and rear frame assemblies 12,14 is a middle support member or bow portion, generally shown at 34. The middle bow portion 34 includes a middle cross bow 36 extending across the bed 18 between the side walls 20 as shown in FIGS. 1, 6, and 14. The middle bow portion 34 also includes two first intermediate links 38 pivotally connected to the middle bow portion 34, and two second intermediate links 40, which are also pivotally connected to the middle bow portion 34. The first intermediate links 38 are connected to a set of first front pivoting flanges 42, and the first front pivoting flanges 42 are connected to the front frame assembly 12.

There are also second front pivoting flanges 44 which are used for connecting a set of first forward links 46 to the front frame assembly 12. The first forward links 46 are part of a front support member or bow portion, generally shown at 48. The front bow portion 48 also includes a front cross bow 50 extending across the bed 18 between the side walls 20, similar to the middle cross bow 36. The first forward links 46 are pivotally connected to the front cross bow 50, and there is also a set of second forward links 52, which are also pivotally connected to the front cross bow 50. The second forward links 52 are pivotally connected to the first intermediate links 38 through the use of a set of first intermediate pivoting flanges 54.

Figure 8:
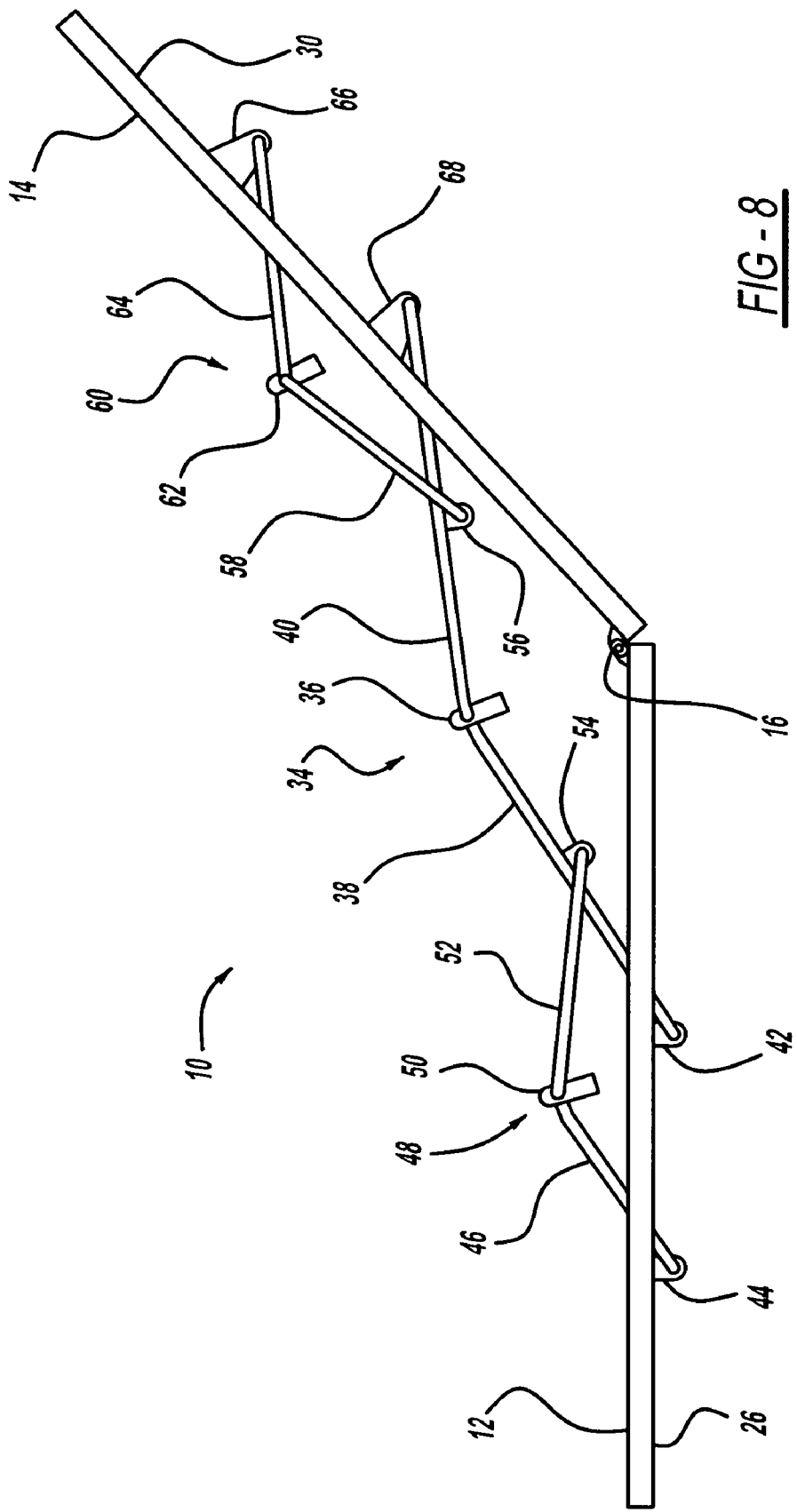
FIG. 8 is a side view of a cable tonneau system in a first partially open position with the cover removed, according to the present invention.
Figure 9:
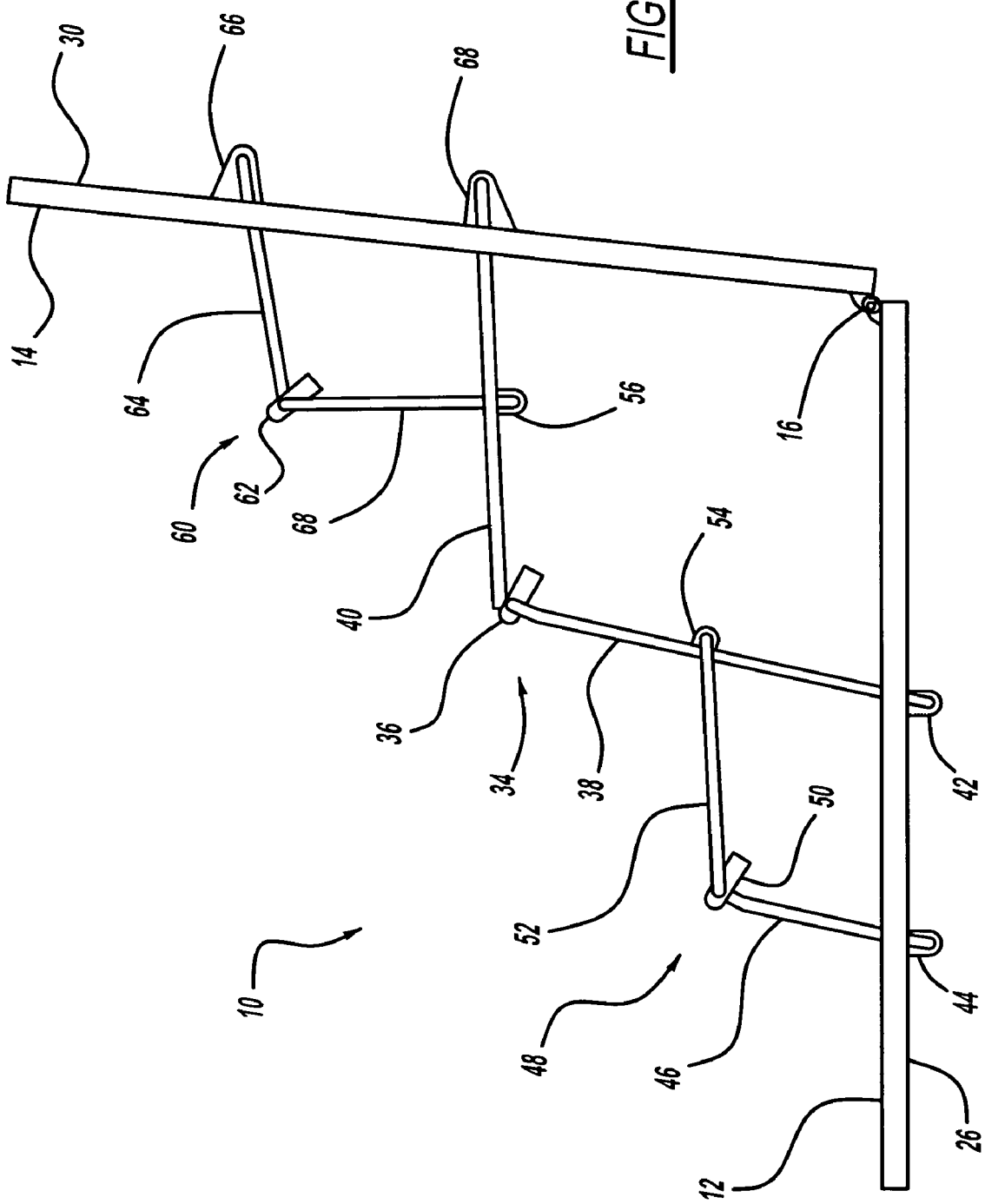
FIG. 9 is a side view of a cable tonneau system in a second partially open position with the cover removed, according to the present invention.
Figure 10:
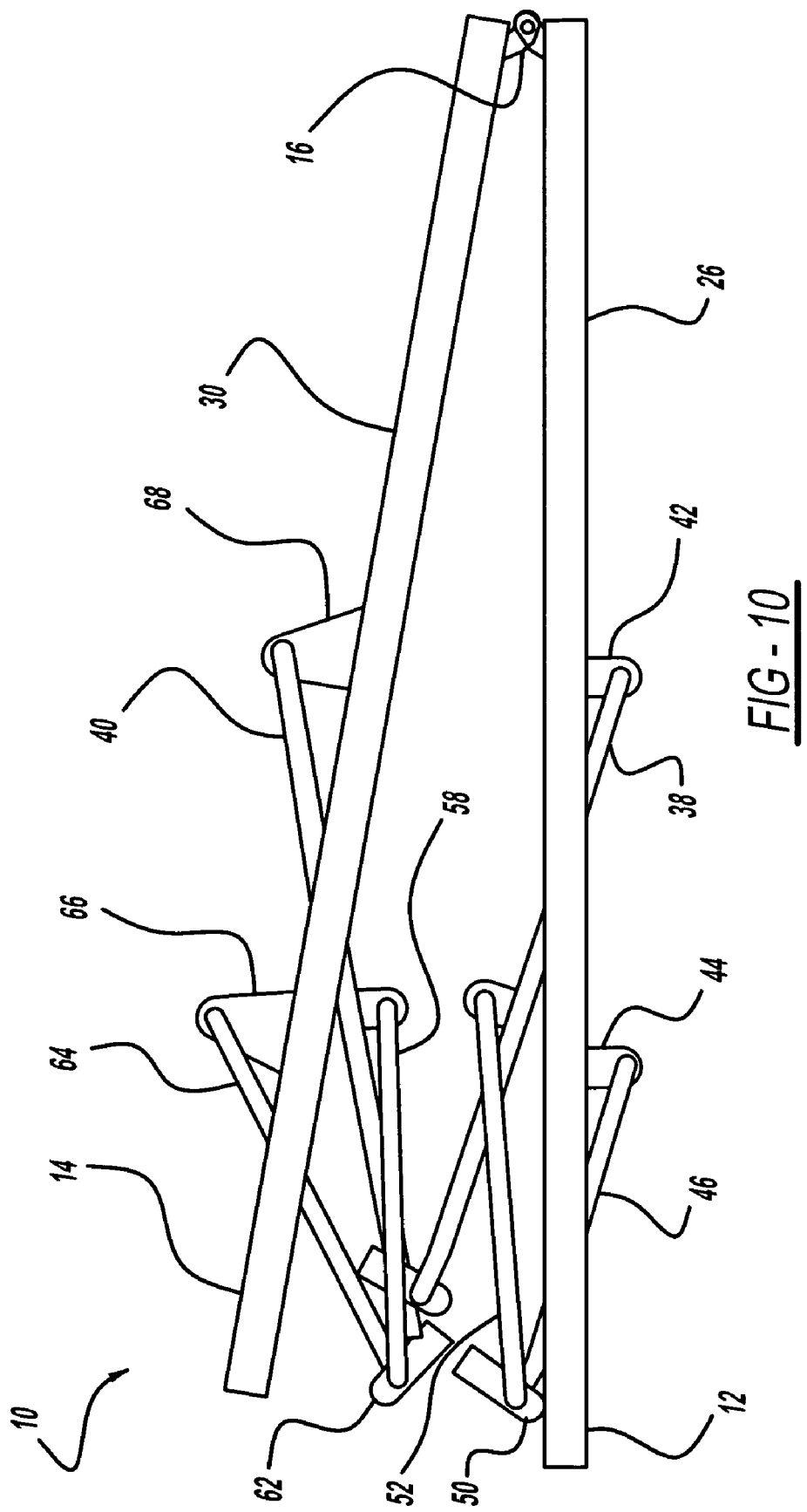
FIG. 10 is a side view of a cable tonneau system in a fully stowed position with the cover removed, according to the present invention.
Figure 11:
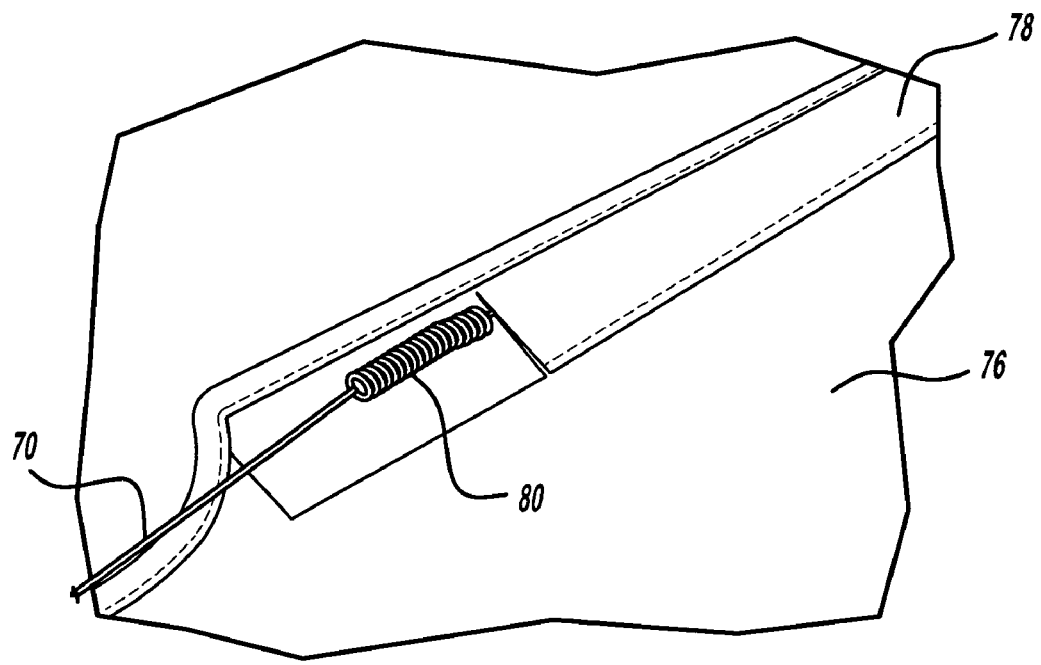
FIG. 11 is a first enlarged perspective view of a cable and spring extending through a cable pocket attached to a cover used in a cable tonneau system, according to the present invention.
Figure 12:
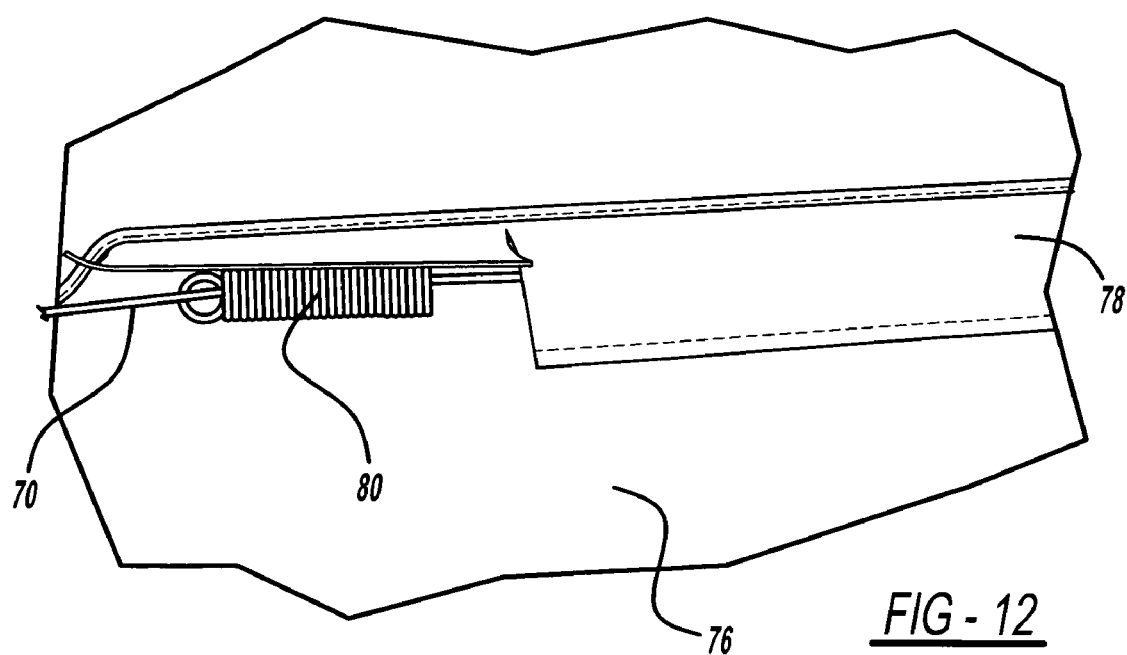
FIG. 12 is a second perspective view of a cable and spring extending through a cable pocket attached to a cover used in a cable tonneau system, according to the present invention.

There are also second intermediate pivoting flanges 56 connected to the second intermediate links 40, and there is a set of first rearward links 58 also pivotally connected to the second intermediate pivoting flanges 56 for providing a pivot relationship between the first rearward links 58 and the second intermediate links 40. The first rearward links 58 are part of a rear support member or bow portion, generally shown at 60. The rear bow portion 60 also has a rear cross bow 62, which in a similar manner to the middle cross bow 36 and the front cross bow 50 also extends across the bed 18 between the side walls 20. The rear bow portion 60 also includes a set of second rearward links 64, which are connected to first rear pivoting flanges 66, with the first rear pivoting flanges 66 being connected to the rear frame assembly 14 as shown in FIGS. 8-10, thereby providing a pivoting relationship between the second rearward links 64 and the rear frame assembly 14. There are also a set of second rear pivoting flanges 68 connected to the rear frame assembly 14 and pivotally connected to the second intermediate links 40 for allowing the second intermediate links 40 to pivot relative to the rear frame assembly 14.

Also included are a pair of cables 70, each cable 70 is attached to the front frame assembly 12 and rear frame assembly 14. Each cable 70 is connected to an outer end, generally shown at 72, of the front side rail 26 in proximity to where the front side rail 26 connects to the front cross rail 28, and each cable 70 is also connected to an outer end, generally shown at 74, of the rear side rail 30 in proximity to where the rear side rail 30 connects to the rear cross rail 32 such that when in the deployed position, each cable 70 will extend along both the side rails 26,30 in a substantially parallel manner, best seen in FIGS. 6, 11-12, and 14.

As mentioned above, the fabric, generally shown at 76, includes cables 70. In the embodiment shown, there are two cables 70, and each cable 70 extends through a cable pocket 78, extending along the sides of the fabric 76 that are substantially parallel to the side rails 26,30 when the cable tonneau system 10 is in the deployed position. There are two cable pockets 78, one for each cable 70. Also included in this embodiment is a spring 80; each cable 70 has a spring 80 for applying the proper amount of tension to the cable 70 when the system 10 is in the deployed position. The tension in each of the cables 70 will aid in maintaining the position of the edges of the fabric 76 along the side rails 26,30, by applying tension to the fabric 76 when the system is in the deployed position.

Figure 19:
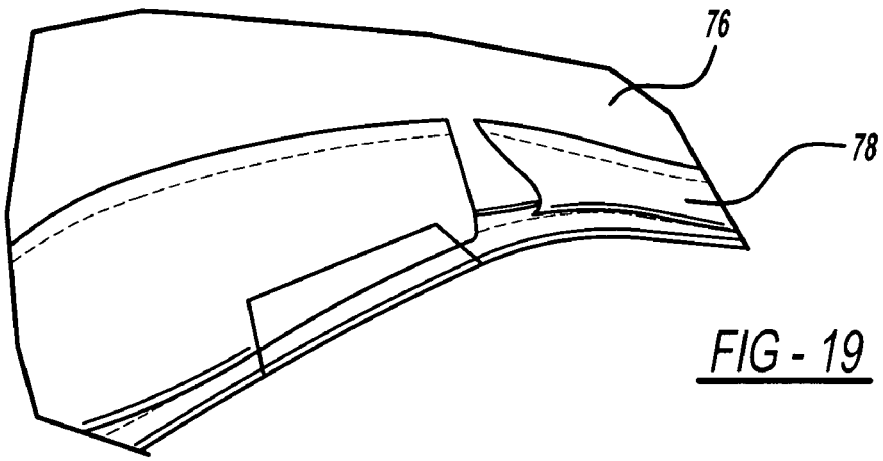
FIG. 19 is a perspective view of an alternate embodiment of a cable extending through a cable pocket used in a cable tonneau system, according to the present invention.
Figure 20:
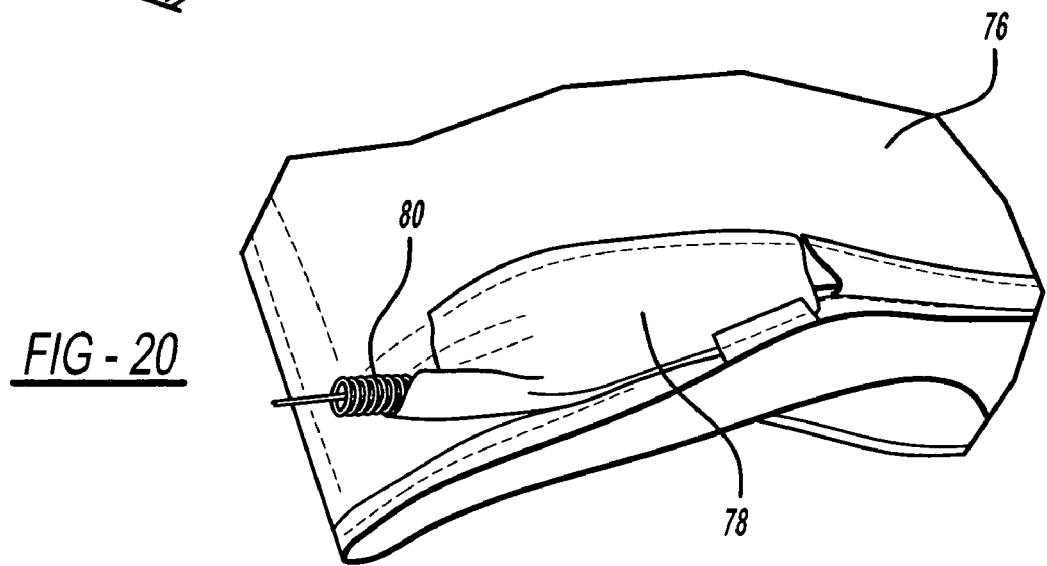
FIG. 20 is a perspective view of another alternate embodiment of a cable extending through a cable pocket used in a cable tonneau system, according to the present invention.
Figure 21:
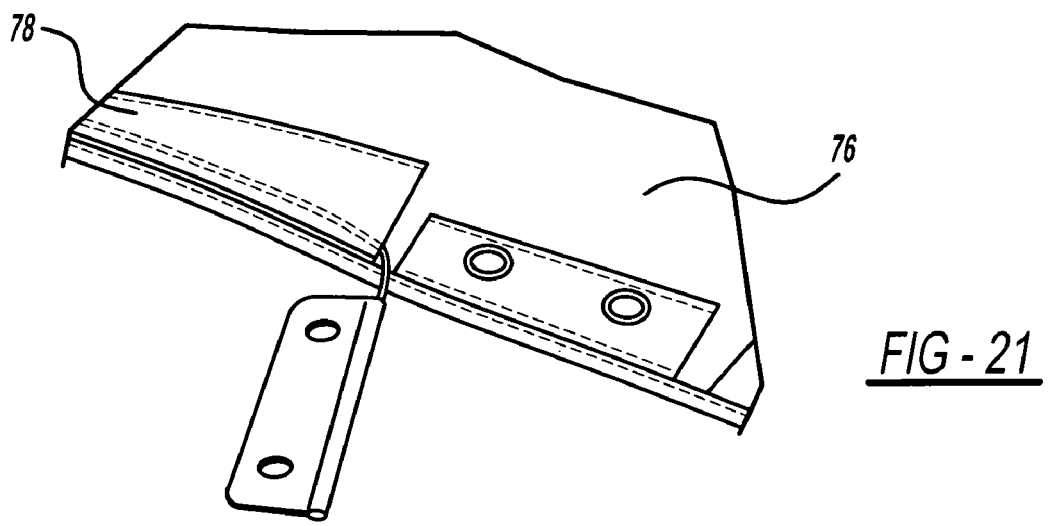
FIG. 21 is a perspective view of yet another alternate embodiment of a cable extending through a cable pocket used in a cable tonneau system, according to the present invention.

In an alternate embodiment, a single cable 70 is used which extends from an outer end 74 of one of the rear side rails 30 along each of the side rails 26,30 on one side of the frame assemblies 12,14 to the front cross rail 28, anchored at the outer end 72 of the front side rail 26 and extends along the front cross rail 28. The single cable 70 is anchored again at the outer end 72 on the front side rail 26 on the opposite side of the front frame assembly 12, and then extends along the side rails 26,30 on the opposite side of the respective frame assemblies 12,14, connecting at the outer end 74 of the rear side rail 30 on the opposite side of the rear frame assembly 14. In another alternate embodiment, the spring(s) 80 are not used, and the cable(s) 70 is of an appropriate length so as to apply the desired amount of tension to the fabric 76 and cable(s) 70 when the system 10 is in the deployed position. Other embodiments of the cable 70 used in a cable pocket 78 are shown in FIGS. 19-21.

Figure 13:
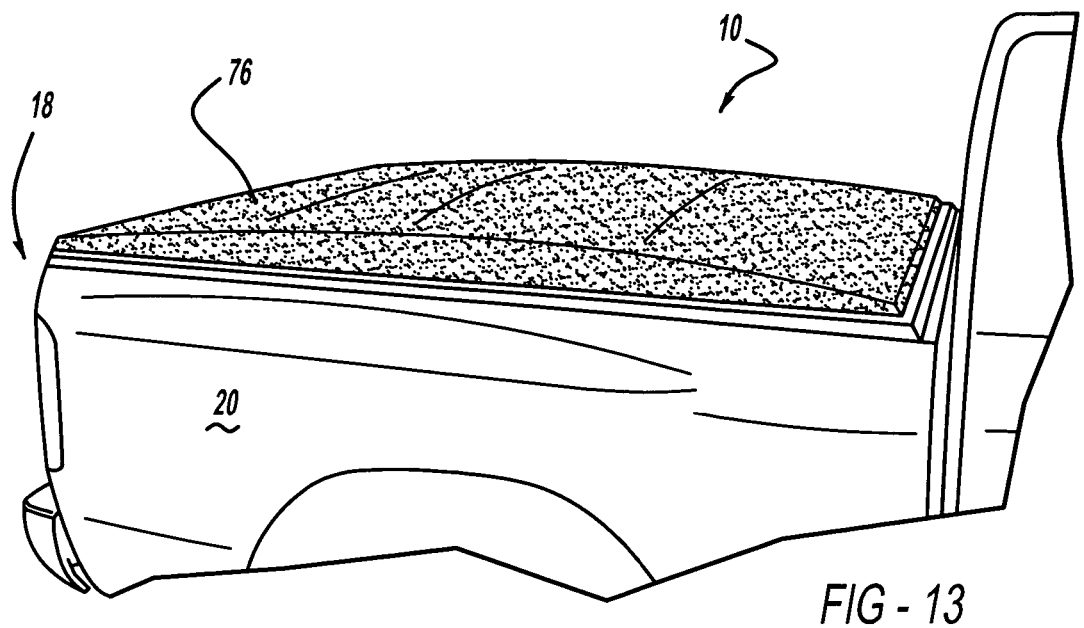
FIG. 13 is a first perspective view of a cable tonneau system attached to the bed of a pickup truck in a deployed position, according to the present invention.
Figure 15:
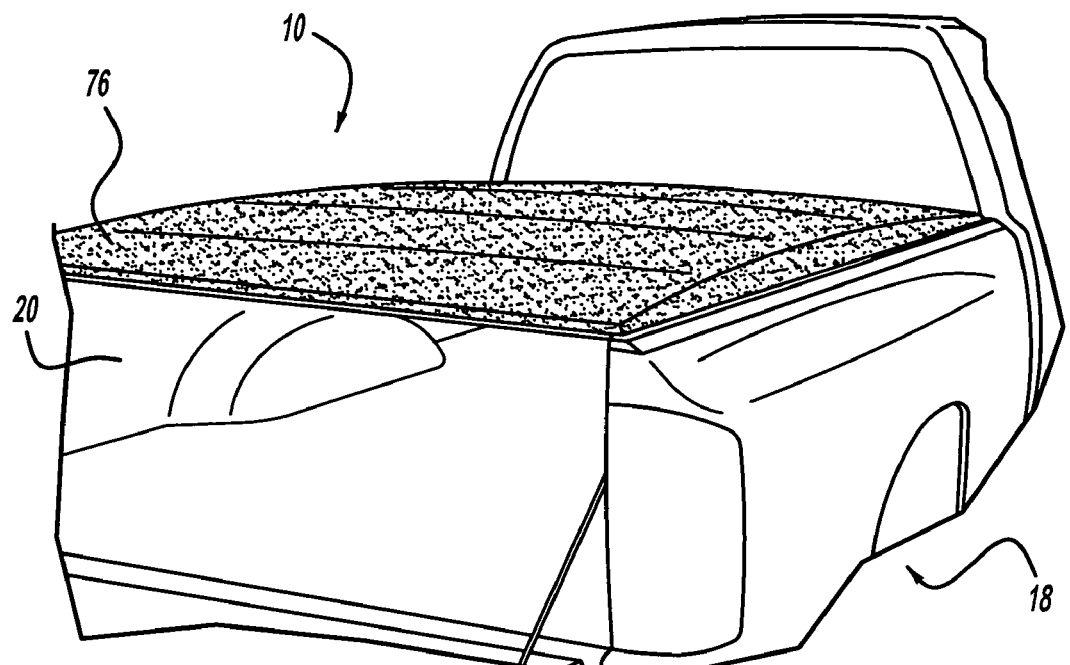
FIG. 15 is a third perspective view of a cable tonneau system attached to the bed of a pickup truck in a deployed position, according to the present invention.
Figure 16:
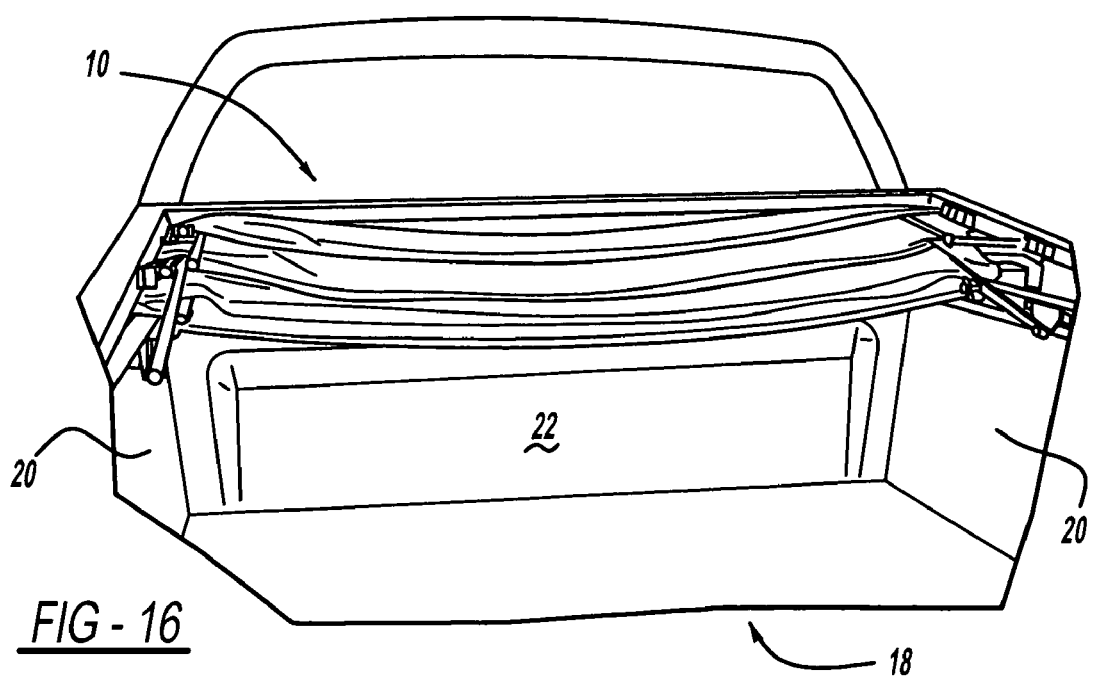
FIG. 16 is a first perspective view of a cable tonneau system attached to the bed of a pickup truck in a stowed position, according to the present invention.
Figure 17:
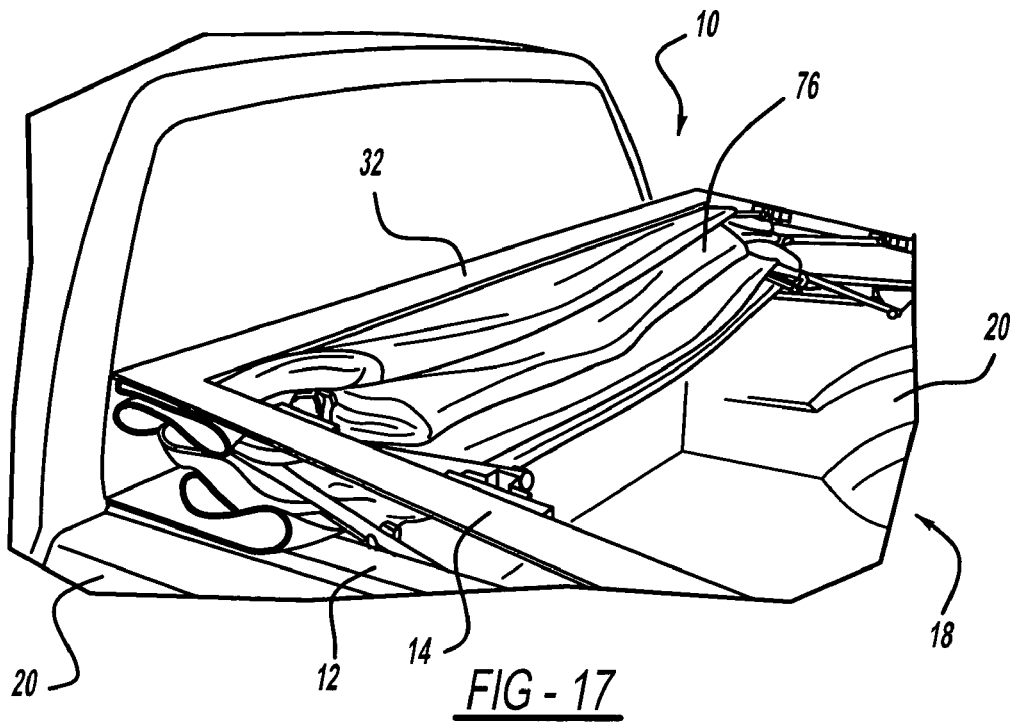
FIG. 17 is a second perspective view of a cable tonneau system attached to the bed of a pickup truck in a stowed position, according to the present invention.
Figure 18:
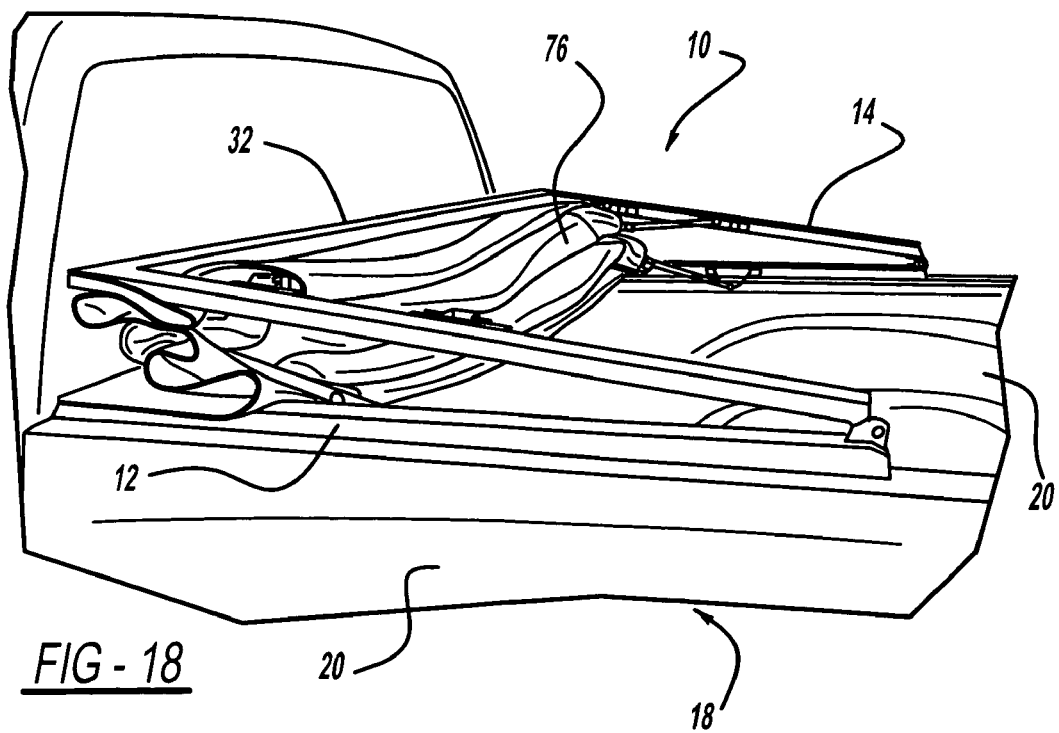
FIG. 18 is a third perspective view of a cable tonneau system attached to the bed of a pickup truck in a stowed position, according to the present invention.

Tension is also applied to the fabric 76 when the system 10 is in the deployed position by the cross bows 36,50,62. As shown in FIGS. 13-15, in this embodiment there are three sleeves 82 attached to the fabric 76, and each of the cross bows 36,50,62 extends through a corresponding sleeve 82 but is not attached to the sleeves 82 such that each of the cross bows 36,50,62 is able to rotate in the sleeves 82. The cross bows 36,50,62 are able to rotate within the sleeves 82 to allow the system 10 to change from the stowed position to the deployed position, and vice versa.

It can also been seen when looking at the Figures that the first front pivoting flanges 42 are connected to the front side rails 26 between the first hinge 16 and the second front pivoting flanges 44. Similarly, the second rear pivoting flanges 68 are connected to the rear side rails 30 between the first hinge 16 and the first rear pivoting flanges 66.

When in the deployed position, the cable tonneau system 10 is shown in the position in FIGS. 1, 6, and 13-15. When it is desired to transport items in the bed 18 that are too large to allow the system 10 to be placed in the deployed position, the system 10 is changed from the deployed position to the stowed position in FIGS. 5, 7, 10, and 16-18.

To change the position of the cable tonneau system 10, there is a pair of latches or clamps (not shown) which connect the rear frame assembly 14 to the base frame 24. The latches are released, and the rear frame assembly 14 will then be pivoted relative to the front frame assembly 12 because of the hinges 16. All of the various links 38,40,46,52,58,64 will pivot accordingly in simultaneous fashion when the rear frame assembly 14 is pivoted relative to the front frame assembly 12; since the movement of the links 38,40,46,52, 58,64 is similar on both sides of the bed 18, only one side will be described.

The various positions the cable tonneau system 10 is operable to change to are shown in FIGS. 1-10, and 13-18. As the rear frame assembly 14 is pivoted relative to the front frame assembly 12, the first intermediate link 38 will pivot relative to the front side rail 26, and the second intermediate link 40 will pivot relative to the rear side rail 30, while at the same time the first intermediate link 38 will pivot relative to the second intermediate link 40. Simultaneously, this will also cause the second forward link 52 to pivot relative to the first intermediate link 38, the second forward link 52 and first forward link 46 to pivot relative to one another, and the first forward link 46 to pivot relative to the front side rail 26. Additionally, the first rearward link 58 will pivot relative to the second intermediate link 40, the first rearward link 58 and second rearward link 64 will pivot relative to one another, and the second rearward link 64 will pivot relative to the rear side rail 30.

As the various links 38,40,46,52,58,64 pivot relative to one another, the cross bows 36,50,62 lift off of the respective side rails 26,30. The fabric 76, or cover, is a substantially flexible material that is connected to the front cross rail 28 and the rear cross rail 32, and the cross bows 36,50,62 extend through the sleeves 82 as described above. The fabric 76 is shaped to substantially match the shape of the bed 18, as shown in FIGS. 13 and 15, and the cables 70 extend through the cable pockets 78, respectively, of the fabric 76 along the side rails 26,30. It should be noted that in this embodiment, the cables 70 are only connected to the respective end portions of the 72,74 of the side rails 26,30, and the fabric 76 is therefore not connected to the side rails 26,30.

The rear frame assembly 14 is pivoted relative to the front frame assembly 12 about the hinges 16 until the system 10 is in the stowed position shown in FIGS. 5, 7, 10, and 16-18. As the frame assemblies 12,14 are pivoted relative to one another, the movement of the fabric 76 will be controlled by the position of the cross bows 36,50,62 and the cables 70, such that the fabric 76 will fold in a predetermined manner when the system 10 is changed from the deployed position to the stowed position. When the rear frame assembly 14 is positioned as shown in FIGS. 5, 7, 10, and 16-18, the entire bed 18 will be exposed for use and stowing items. Also, there are latches (not shown) which are used for locking the rear frame assembly 14 to the front frame assembly 12 when the system 10 is in the stowed position, and the bed 18 is in use.

When the system 10 is in the deployed position, the cross bows 36,50,62 will contact the frame assemblies 12,14 by way of an angled end portion 84, which also provides support for the cross bows 36,50,62. The cross bows 36,50,62 also support the fabric 76, and help to give the fabric 76 a contoured look when the system 10 is in the deployed position. Additionally, the cables 70 are of a specific length, and the cables 70 and springs 80 are configured such that when the system 10 is in the deployed position, there is tension in the cables 70, which will force the outer edges of the fabric 76 to extend along the side rails 26,30. Because the fabric 76 is permanently affixed to the cross rails 28,32 and the cross bows 36,50,62 extend through the sleeves 82, respectively, the fabric 76 will automatically spread out to cover the bed 18 when the system 10 is in the deployed position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cable tonneau system, comprising:

at least one frame assembly selectively mounted to a vehicle;

at least one bow portion having a plurality of links pivotally connected to said at least one frame assembly;

a cover operatively connected to said at least one frame assembly and said at least one bow portion for concealing a storage area of said vehicle such that said at least one frame assembly and said plurality of links are operable to be pivoted between a stowed position and a deployed position, said cover will expose said storage area of said vehicle when said at least one frame assembly and said plurality of links are in said stowed position, and said cover will conceal said storage area of said vehicle when said at least one frame assembly and said plurality of links are in said deployed position;

said at least one bow further comprising:

a middle bow portion operatively connected to one or more of said plurality of links and said cover, and operable to be moved between said stowed position and said deployed position;

a front bow portion operatively connected to one or more of said plurality of links and said cover, and operable to be moved between said stowed position and said deployed position;

a rear bow portion operatively connected to one or more of said plurality of links and said cover, and operable to be moved between said stowed position and said deployed position;

wherein as said middle bow portion, said front bow portion, said rear bow portion, and said plurality of links are moved to said stowed position, said cover will expose said storage area, and as said middle bow portion, said front bow portion, said rear bow portion, and said plurality of links are moved to said deployed position, said cover will conceal said storage area;

said middle bow portion further comprising:
- at least one middle cross bow operable for contacting said at least one frame assembly when said cable tonneau system is in said deployed position, said at least one middle cross bow slidably disposed through a first sleeve attached to said cover such that said at least one middle cross bow will support said cover when said cable tonneau system is in said deployed position;
- at least one first intermediate link pivotally connected to said at least one frame assembly and said at least one middle cross bow;
- at least one second intermediate link pivotally connected to said at least one frame assembly, said at least one first intermediate link pivotally connected to said at least one middle cross bow such that when said at least one middle cross bow, said at least one first intermediate link and said at least one second intermediate link are moved from said stowed position to said deployed position, said at least one first intermediate link will pivot relative to said at least one frame assembly and said at least one middle cross bow, and said at least one second intermediate link will also pivot relative to said at least one frame assembly and said at least one middle cross bow;

said front bow portion further comprising:
- at least one front cross bow, said at least one front cross bow operable for contacting said at least one frame assembly when said cable tonneau system is in said deployed position, said at least one front cross bow slidably disposed through a second sleeve attached to said cover such that said at least one middle cross bow will support said cover when said cable tonneau system is in said deployed position;
- at least one first forward link pivotally connected to said at least frame assembly and to said at least one front cross bow;
- at least one second forward link pivotally connected to said at least one front cross bow and said at least one first intermediate link such that when said cable tonneau system is moved between said stowed position and said deployed position, said at least one first forward link pivots relative to said at least one frame assembly and said at least one front cross bow, said at least one second forward link will pivot relative to said at least one first intermediate link and said at least one front cross bow;

said rear bow portion further comprising:
- at least one rear cross bow, said at least one rear cross bow operable for contacting said at least one frame assembly when said cable tonneau system is in said deployed position, said at least one rear cross bow slidably disposed through a third sleeve attached to said cover such that said at least one rear cross bow will support said cover when said cable tonneau system is moved in said deployed position;
- at least one first rearward link pivotally connected to said at least one second intermediate link and said at least one rear cross bow;
- at least one second rearward link pivotally connected to said at least one rear cross bow and said at least one frame assembly such that when said cable tonneau system is moved between said stowed position and said deployed position, said at least one second rearward link will pivot relative to said at least one frame assembly and said at least one rear cross bow, said at least one first rearward link will pivot relative to said at least one second intermediate link and said at least one rear cross bow; and
- an angled portion formed as part of said at least one rear cross bow, said angled portion operable for contacting said at least one frame assembly when said at least one frame assembly is in said deployed position.

2. The cable tonneau system of claim 1, said at least one frame assembly further comprising:
- a front frame assembly having at least one front side rail and at least one front cross rail, said at least one front side rail being substantially perpendicular to said at least one front cross rail; and
- a rear frame assembly having at least one rear side rail and at least one rear cross rail, said at least one rear side rail being substantially perpendicular to said at least one rear cross rail, said at least one rear side rail being pivotally connected to said at least one front side rail to provide said front frame assembly and said rear frame assembly to be moveable between said stowed position and said deployed position;
- wherein said at least one front side rail is pivoted relative to said at least one rear side rail when said front frame assembly and said rear frame assembly are moved between said stowed position and said deployed position.

3. The cable tonneau system of claim 2, further comprising:
- at least one cable operably connected to an end portion of said at least one front side rail and an end portion of said at least one rear side rail;
- at least one cable pocket formed as part of said cover, said cable extending through at least a portion of said at least one cable pocket such that when said at least one frame assembly and said plurality of links are moved between said deployed position and said stowed position, said at least one bow portion and said at least one cable directs said cover to fold to expose said storage area.

4. The cable tonneau system of claim 2, further comprising a hinge connected to said at least one front side rail and said at least one rear side rail for providing a pivoting relationship between said front frame assembly and said rear frame assembly.

5. The cable tonneau system of claim 2, further comprising a base frame, said vehicle further comprising a pickup having a bed, wherein said base frame is mounted onto the bed of said pickup, said front frame assembly and said rear frame assembly being operatively mounted on said base frame.

6. The cable tonneau system of claim 1, further comprising an angled portion formed as part of said at least one middle cross bow, said angled portion operable for contacting said at least one frame assembly when said at least one frame assembly is in said deployed position.

7. The cable tonneau system of claim 1, further comprising a first front pivoting flange connected to said at least one frame assembly, said at least one first intermediate link being pivotally connected to said first front pivoting flange to provide a pivot relationship between said at least one frame assembly and said at least one first intermediate link.

8. The cable tonneau system of claim 1, further comprising an angled portion formed as part of said at least one front cross bow, said angled portion operable for contacting said at least one frame assembly when said at least one frame assembly is in said deployed position.

9. The cable tonneau system of claim 1, further comprising a second front pivoting flange connected to said at least one frame assembly, said at least one first forward link being pivotally connected to said second front pivoting flange to provide a pivot relationship between said at least one frame assembly and said at least one first forward link.

10. The cable tonneau system of claim 1, further comprising
a first intermediate pivoting flange connected to said at least one first intermediate link, said at least one second forward link being pivotally connected to said first intermediate pivoting flange to provide a pivot relationship between said at least one first intermediate link and said at least one second forward link; and
a second intermediate pivoting flange connected to said at least one second intermediate link, said at least one first rearward link being pivotally connected to said second intermediate pivoting flange to provide a pivot relationship between said at least one second intermediate link and said at least one first rearward link.

11. The cable tonneau system of claim 1, further comprising
a first rear pivoting flange connected to said at least one frame assembly, said at least one second rearward link being pivotally connected to said first rear pivoting flange to provide a pivoting relationship between said at least one second rearward link and said at least one frame assembly; and
a second rear pivoting flange connected to said at least one frame assembly, said at least one second intermediate link being pivotally connected to said second rear pivoting flange to provide a pivoting relationship between said at least one second intermediate link and said at least one frame assembly.

12. A cable tonneau system, comprising:
a front frame assembly;
a rear frame assembly pivotally connected to said front frame assembly;
a middle bow portion pivotally connected to said front frame assembly and said rear frame assembly;
a front bow portion pivotally connected to said front frame assembly and said middle bow portion;
a rear bow portion pivotally connected to said rear frame assembly and said middle bow portion; and
a cover operable for concealing a storage area of a vehicle when said cable tonneau system is in a deployed position, and when said cable tonneau system is moved from said deployed position to a stowed position, said front frame assembly is pivoted relative to said rear frame assembly, causing said middle bow portion to pivot relative to said front frame assembly and said rear frame assembly, said front bow portion to pivot relative to said front frame assembly and said middle bow portion, and said rear bow portion to pivot relative to said rear frame assembly and said middle bow portion, and said cover to fold such that said storage area of said vehicle is exposed.

13. The cable tonneau system of claim 12, further comprising:
at least one front side rail formed as part of said front frame assembly;
at least one front cross rail formed as part of said front frame assembly and being substantially perpendicular to said at least one front side rail;
at least one rear side rail formed as part of said rear frame assembly;
at least one hinge connected to said at least one front side rail and said at least one rear side rail for providing a pivoting relationship between said at least one front side rail and said at least one rear side rail; and
at least one rear cross rail formed as part of said rear frame assembly and being substantially perpendicular to said at least one rear side rail;
wherein said cover is connected to said at least one front cross rail and said cover is connected to said at least one rear cross rail such that when said front frame assembly is pivoted relative to said rear frame assembly, said the pivoting between said front frame assembly and said rear frame assembly will fold said cover such that said storage area of said vehicle is exposed.

14. The cable tonneau system of claim 13, further comprising:
at least one cable operably connected to an end portion of said at least one front side rail and an end portion of said at least one rear side rail; and
at least one cable pocket attached to said cover, said at least one cable extending through at least a portion of said at least one cable pocket such that when said front frame assembly and said rear frame assembly are moved from said deployed position to said stowed position, said at least one cable will cause said cover to fold and expose said storage area.

15. The cable tonneau system of claim 13, further comprising a base frame for supporting said front frame assembly and said rear frame assembly, said vehicle further comprising a pickup and said storage area further comprising a bed of said pickup, wherein said front frame assembly and said rear frame assembly are mounted on said base frame.

16. The cable tonneau system of claim 12, said middle bow portion further comprising:
at least one cross middle bow;
at least one first intermediate link pivotally connected to said at least one middle cross bow;
at least one second intermediate link pivotally connected to said rear frame assembly and said at least one middle cross bow;
a first front pivoting flange connected to said front frame assembly, said at least one first intermediate link being pivotally connected to said first front pivoting flange such that when said cable tonneau system is moved between said stowed position and said deployed position, said at least one first intermediate link pivots relative to said at least one middle cross bow and said front frame assembly and said at least one second intermediate link pivots relative to said at least one middle cross bow and said rear frame assembly.

17. The cable tonneau system of claim 16, further comprising an angled portion formed as part of said at least one middle cross bow, said angled portion operable for contacting said rear frame assembly when said cable tonneau system is in said deployed position.

18. The cable tonneau system of claim 16, further comprising a first sleeve formed as part of said cover, said at least one middle cross bow being slidably disposed in said first sleeve such that said at least one middle cross bow supports said cover when said cable tonneau system is in said deployed position.

19. The cable tonneau system of claim 16, said front bow portion further comprising:
at least one front cross bow;
at least one first forward link pivotally connected to said at least one front cross bow;
at least one second forward link pivotally connected to said at least one first intermediate link and said at least one front cross bow; and
a second front pivoting flange connected to said front frame assembly, said at least one first forward link being pivotally connected to said second front pivoting flange such that when said cable tonneau system is moved between said stowed position and said deployed position, said at least one first forward link pivots relative to said at least one front cross bow and said front frame assembly and said at least one second forward link pivots relative to said at least one front cross bow and said at least one first intermediate link.

20. The cable tonneau system of claim 19, further comprising an angled portion formed as part of said at least one front cross bow, said angled portion operable for contacting said front frame assembly when said cable tonneau system is in said deployed position.

21. The cable tonneau system of claim 19, further comprising a second sleeve formed as part of said cover, said at least one front cross bow being slidably disposed in said second sleeve such that said at least one front cross bow supports said cover when said cable tonneau system is in said deployed position.

22. The cable tonneau system of claim 19, said rear bow portion further comprising:
   at least one rear cross bow;
   at least one first rearward link pivotally connected to said at least one rear cross bow;
   at least one second rearward link pivotally connected to said at least one rear cross bow;
   a first intermediate pivoting flange connected to said at least one first intermediate link, said at least one second forward link being pivotally connected to said first intermediate pivoting flange to provide a pivot relationship between said at least one first intermediate link and said at least one second forward link; and
   a second intermediate pivoting flange connected to said at least one second intermediate link, said at least one first rearward link being pivotally connected to said second intermediate pivoting flange to provide a pivot relationship between said at least one second intermediate link and said at least one first rearward link;
   wherein as said cable tonneau system is moved between said stowed position and said deployed position said at least one first rearward link will pivot relative to said rear frame assembly and said at least one rear cross bow, and said at least one second rearward link will pivot relative to said at least one second intermediate link and said at least one rear cross bow.

23. The cable tonneau system of claim 22, further comprising:
   a first rear pivoting flange connected to said rear frame assembly, said at least one second rearward link being pivotally connected to said first rear pivoting flange to provide a pivoting relationship between said at least one second rearward link and said rear frame assembly; and
   a second rear pivoting flange connected to said rear frame assembly, said at least one second intermediate link being pivotally connected to said second rear pivoting flange to provide a pivoting relationship between said at least one second intermediate link and said rear frame assembly.

24. The cable tonneau system of claim 22, further comprising and angled portion formed as part of at least one rear cross bow, said angled portion operable for contacting said rear frame assembly when said cable tonneau system is in said deployed position.

25. The cable tonneau system of claim 22, further comprising a third sleeve formed as part of said cover, said at least one rear cross bow being slidably disposed in said third sleeve such that said at least one rear cross bow supports said cover when said cable tonneau system is in said deployed position.

26. A cable tonneau system, comprising:
   a front frame assembly;
   at least one front side rail formed as part of said front frame assembly;
   at least one front cross rail connected to and being substantially perpendicular in relation to said at least one front side rail a rear frame assembly;
   at least one rear side rail formed as part of said rear frame assembly;
   at least one rear cross rail connected to and being substantially perpendicular in relation to said at least one rear side rail;
   a hinge operable for providing a pivot connection between said at least one front side rail and said at least one rear side rail for changing said cable tonneau system between a stowed position and a deployed position;
   a base frame mounted upon a pickup bed, said front frame assembly and said rear frame assembly operable for being mounted to said base frame;
   a middle bow portion having at least one middle cross bow, said at least one middle cross bow operable for contacting said at least one rear side rail when said cable tonneau system is in said deployed position;
   at least one first intermediate link pivotally connected to said at least one front side rail and said at least one middle cross bow;
   at least one second intermediate link pivotally connected to said at least one rear side rail, said at least one first intermediate link pivotally connected to said at least one middle cross bow such that when said cable tonneau system is moved from said stowed position to said deployed position, said at least one first intermediate link will pivot relative to said at least one front side rail and said at least one middle cross bow, and said at least one second intermediate link will also pivot relative to said at least one rear side rail and said at least one middle cross bow;
   a front bow portion having at least one front cross bow, said at least one front cross bow operable for contacting said at least one front side rail when said cable tonneau system is in said deployed position;
   at least one first forward link pivotally connected to said at least one front side rail and to said at least one front cross bow;
   at least one second forward link pivotally connected to said at least one front cross bow and said at least one first intermediate link such that when said cable tonneau system is moved between said stowed position and said deployed position, said at least one first forward link pivots relative to said at least one front side rail and said at least one front cross bow, said at least one second forward link will pivot relative to said at least one first intermediate link and said at least one front cross bow;
   a rear bow portion having at least one rear cross bow, said at least one rear cross bow operable for contacting said at least one rear side rail when said cable tonneau system is in said deployed position;
   at least one first rearward link pivotally connected to said at least one second intermediate link and said at least one rear cross bow;
   at least one second rearward link pivotally connected to said at least one rear cross bow and said at least one rear side rail such that when said cable tonneau system is moved between said stowed position and said deployed position, said at least one second rearward link will pivot relative to said at least one rear side rail and said at least one rear cross bow, said at least one second rearward link will pivot relative to said at least one second intermediate link and said at least one rear cross bow; and a cover attached to said at least one front cross rail, said at least one rear cross rail, said front cross bow, said intermediate cross bow, and said rear cross bow such that said cover will fold and expose a storage area of a vehicle when said cable tonneau system is in said deployed position.

27. The cable tonneau system of claim 26, further comprising:

a first front pivoting flange connected to said at least one front side rail, said at least one first intermediate link being pivotally connected to said first front pivoting flange to providing a pivot relationship between said at least one front side rail and said at least one first intermediate link; and a second front pivoting flange connected to said at least one front side rail, said at least one first forward link being pivotally connected to said second front pivoting flange to provide a pivot relationship between said at least one front side rail and said at least one first forward link.

28. The cable tonneau system of claim 26, further comprising:

a first intermediate pivoting flange connected to said at least one first intermediate link, said at least one second forward link being pivotally connected to said first intermediate pivoting flange to provide a pivot relationship between said at least one first intermediate link and said at least one second forward link; and a second intermediate pivoting flange connected to said at least one second intermediate link, said at least one first rearward link being pivotally connected to said second intermediate pivoting flange to provide a pivot relationship between said at least one second intermediate link and said at least one first rearward link.

29. The cable tonneau system of claim 26, further comprising:

a first rear pivoting flange connected to said at least one rear side rail, said at least one second rearward link being pivotally connected to said first rear pivoting flange to provide a pivoting relationship between said at least one second rearward link and said at least one rear side rail; and a second rear pivoting flange connected to said at least one rear side rail, said at least one second intermediate link being pivotally connected to said second rear pivoting flange to provide a pivoting relationship between said at least one second intermediate link and said at least one rear side rail.

30. The cable tonneau system of claim 26, each of said at least one front cross bow, said at least one middle cross bow, and said at least one rear cross bow further comprising and angled portion operable for contacting one of said at least one front side rail or said at least one rear side rail when said cable tonneau system is in said deployed position.

31. The cable tonneau system of claim 26, further comprising:

a first cable operably connected to a first outer end portion of said at least one front side rail and a first outer end of said at least one rear side rail;

a second cable operably connected to a second outer end portion of said at least one front side rail and a second outer end of said at least one rear side rail; and said cover further comprising a fabric connected to said at least one front cross bow, said at least one middle cross bow, and said at least one rear cross bow, and said first cable and said second cable operable for extending through said fabric such that when said cable tonneau system is moved from said stowed position to said deployed position, said fabric is positioned such that said storage area of said vehicle exposed.

32. The cable tonneau system of claim 26, further comprising:

a first sleeve formed as part of said fabric, said at least one middle cross bow slidably extending through said first sleeve;

a second sleeve formed as part of said fabric, said at least one front cross bow slidably extending through said second sleeve; and a third sleeve formed as part of said fabric, said at least one rear cross bow slidably extending through said third sleeve such that as said cable tonneau system is moved from said deployed position to said stowed position, the movement of said at least one middle cross bow, said at least one front cross bow, and said at least one rear cross bow will fold said fabric.

* * * * *

UNITED STATES PATENT AND TRADEMARK OFFICE
CERTIFICATE OF CORRECTION

| | | |
|---|---|---|
| PATENT NO. | : 8,186,740 B2 | Page 1 of 2 |
| APPLICATION NO. | : 12/456729 | |
| DATED | : May 29, 2012 | |
| INVENTOR(S) | : Huotari et al. | |

It is certified that error appears in the above-identified patent and that said Letters Patent is hereby corrected as shown below:

Column 3,
Line 22, "invention;" should be -- invention. --.

Column 5,
Line 11, "been" should be -- be --.

Column 5,
Line 61, remove "of the".

Column 7,
Line 37, Claim 1, "said at least frame" should be -- said at least one frame --.

Column 9,
Lines 4-5, Claim 10, "comprising" should be -- comprising: --.

Column 9,
Lines 16-17, Claim 11, "comprising" should be -- comprising: --.

Column 10,
Line 7, Claim 13, "said the" should be -- the --.

Column 11,
Line 61, Claim 24, "and angled" should be -- an angled --.

Column 12,
Line 9, Claim 26, "side rail" should be -- side rail; --.

Column 14,
Line 9, Claim 30, "and" should be -- an --.

Signed and Sealed this
Twenty-seventh Day of November, 2012

David J. Kappos
*Director of the United States Patent and Trademark Office*

Column 14,
Line 28, Claim 31, "vehicle exposed" should be -- vehicle is exposed --.